(12) United States Patent
Krishnaswamy et al.

(10) Patent No.: US 12,457,165 B2
(45) Date of Patent: *Oct. 28, 2025

(54) DECENTRALIZED WIDE-AREA NETWORK TRAFFIC ENGINEERING

(71) Applicant: MICROSOFT TECHNOLOGY LICENSING, LLC, Redmond, WA (US)

(72) Inventors: Umesh Krishnaswamy, San Jose, CA (US); Rachee Singh, Redmond, WA (US); Nikolaj Bjorner, Woodinville, WA (US); Himanshu Raj, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,686

(22) Filed: Sep. 26, 2023

(65) Prior Publication Data

US 2024/0015094 A1 Jan. 11, 2024

Related U.S. Application Data

(63) Continuation of application No. 17/827,675, filed on May 28, 2022, now Pat. No. 11,811,646.

(Continued)

(51) Int. Cl.
*H04L 45/125* (2022.01)
*H04L 45/18* (2022.01)
*H04L 45/50* (2022.01)

(52) U.S. Cl.
CPC ............ *H04L 45/125* (2013.01); *H04L 45/18* (2013.01); *H04L 45/50* (2013.01)

(58) Field of Classification Search
CPC . H04L 41/0893; H04L 41/0895; H04L 12/46; H04L 5/00; H04L 45/00;
(Continued)

(56) References Cited

U.S. PATENT DOCUMENTS 8,467,289 B2 * 6/2013 Kini .................. H04L 45/22
370/409
9,111,288 B2 * 8/2015 Paul .................. H04L 9/40
(Continued)

*Primary Examiner* — Sai Aung
(74) *Attorney, Agent, or Firm* — Han Gim; Newport IP, LLC

(57) ABSTRACT

A system manages network traffic in a distributed system comprising a plurality of network devices. The network devices are divided into a plurality of network slices, each of the network slices including a subset of the network devices such that there is no overlap of network devices between the network slices. Individual network slices are associated with individual slice controllers, and an individual slice controller is configured to manage network routing of an individual network slice. Each of the individual slice controllers route the network traffic within each respective individual network slice. The network traffic is independently routed based on expected network conditions for each respective individual network slice, and data defining routing decisions is contained within each network slice to limit fault effects between the network slices.

17 Claims, 9 Drawing Sheets

Related U.S. Application Data

(60) Provisional application No. 63/315,048, filed on Feb. 28, 2022.

(58) Field of Classification Search
CPC ..... H04L 45/302; H04L 45/745; H04L 47/72; H04L 47/78; H04L 1/00
See application file for complete search history.

(56) References Cited

U.S. PATENT DOCUMENTS

| | | | |
|---|---|---|---|
| 2005/0013242 A1* | 1/2005 | Chen | H04L 45/28 370/244 |
| 2007/0174483 A1* | 7/2007 | Raj | H04L 45/22 709/238 |
| 2015/0117194 A1* | 4/2015 | Nishioka | H04L 45/02 370/230.1 |
| 2020/0351765 A1* | 11/2020 | Liu | H04W 48/18 |
| 2021/0006453 A1* | 1/2021 | Dutta | H04L 41/0681 |
| 2021/0136680 A1* | 5/2021 | Browne | H04L 43/0852 |
| 2021/0321325 A1* | 10/2021 | Srivastava | H04W 80/02 |
| 2022/0094638 A1* | 3/2022 | Dutta | H04L 45/302 |
| 2024/0236733 A1* | 7/2024 | Ping | H04W 24/08 |

\* cited by examiner

DECENTRALIZED WIDE-AREA NETWORK TRAFFIC ENGINEERING

CROSS-REFERENCE TO RELATED APPLICATIONS

The present application is a continuation of U.S. patent application Ser. No. 17/827,675, filed on May 28, 2022 which claims priority to, U.S. Provisional Application Ser. No. 63/315,048, filed on Feb. 28, 2022, the contents of which are hereby incorporated by reference in their entirety.

BACKGROUND

Cloud-based wide-area networks (WANs) enable low-latency and high bandwidth cloud applications. To efficiently utilize the infrastructure of the cloud-based WANs, cloud providers typically employ centralized, software-defined traffic engineering (TE) systems. A centralized TE system may leverage global views of the topology and aim to maximize the network throughput. Centralized TE controllers may achieve higher network throughput as compared to decentralized implementations but can be a single point of failure in the network. It is with respect to these considerations and others that the disclosure made herein is presented.

SUMMARY

In various embodiments, techniques are described for managing network traffic in a distributed computing system. The techniques can be implemented by a software-defined decentralized wide-area network traffic engineering system that includes a controller. The decentralized traffic engineering system can be implemented in a wide-area network (WAN) that is sliced into smaller fault domains, each managed by its own slice controller. The slice controllers may independently engineer traffic in their slices to maximize global network throughput without relying on hierarchical or central coordination. The techniques can include implementation of loop-free inter-slice routing. By slicing a WAN into smaller fault domains, the decentralized traffic engineering system may reduce the blast radius of a slice controller failure as compared to distributed design principles.

The described techniques can allow for the reduction in blast radius when a slice controller fails by isolating slices with a small blast radius so that outages caused by failures in a slice is prevented from causing a global impact, even with inter-slice traffic. This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DESCRIPTION

The present disclosure describes techniques for managing network traffic in a distributed computing system. The techniques can be implemented by a software-defined decentralized wide-area network traffic engineering system that includes a controller. The techniques can include WAN slicing and implementation of loop-free inter-slice routing. The decentralized traffic engineering system can be implemented in a wide-area network that is sliced into smaller fault domains, each managed by its own slice controller. The slice controllers may independently engineer traffic in their slices to maximize global network throughput without relying on hierarchical or central coordination.

In an embodiment, routers in a given site may be assigned to separate slice controllers. In one embodiment, the decentralized traffic engineering system may not use any central controllers and each slice controller may perform global traffic engineering calculations and slice-local route programming.

In various embodiments, large scale networks may use controllers (which may be referred to herein as a traffic engineering (TE) controller) with isolated fault domains to contain or limit the blast radius of faults. A blast radius of a TE controller is the fraction of customer or tier-0 traffic at risk due to a TE controller failure. The decentralized traffic engineering system may reduce the blast radius by slicing the global cloud WAN into smaller fault domains or slices. The decentralized traffic engineering system aims to strike a balance between centralized vs. distributed design principles.

The blast ripple of a controller failure is the service level degradation experienced by components that are not governed by the failing TE controller. The blast or failure of a TE controller can cause ripples and impact traffic not managed by the failing controller. The impact of the ripple is proportional to the amount of tier-0 traffic affected that is not managed by the failing controller. Blast shielding is the engineering practice that minimizes the blast radius of failing components while meeting operational constraints such as cost and complexity.

As used herein, a slice is a logical partitioning of the WAN into disjoint sets of routers where each router belongs to exactly one slice. A slice can consist of a single router or all routers, or anything in between. Routers do not have any slice-specific configuration.

Figure 1:
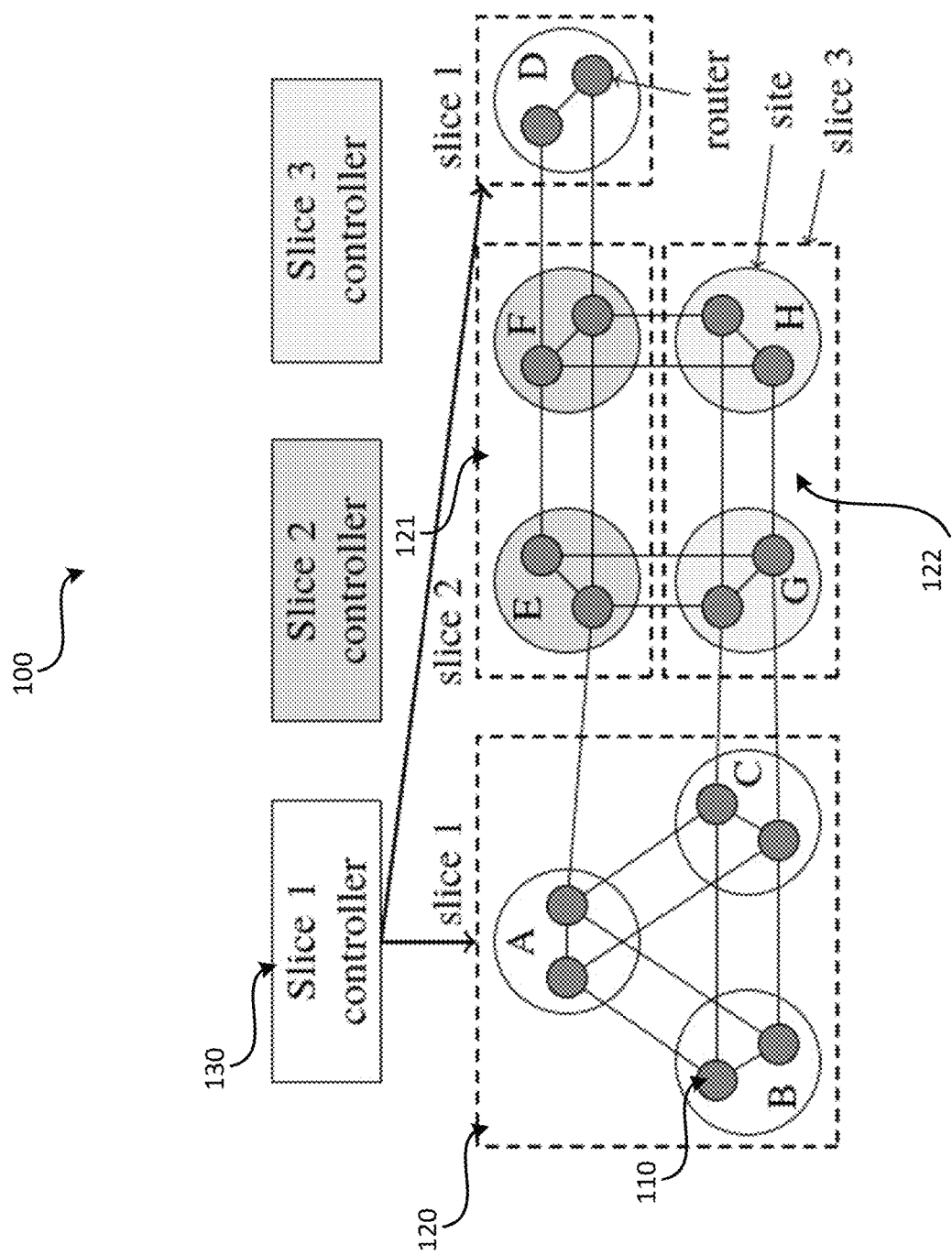
FIG. 1 is a diagram illustrating an example architecture in accordance with the present disclosure.

In an embodiment of the present disclosure, decentralized traffic engineering system divides the WAN into slices or subgraphs of routers, each controlled by a dedicated slice controller. FIG. 1 illustrates an example distributed computing system 100 including network devices (e.g., routers) 110, network slices 1, 2, 3 (120, 121, 122), and slice 1 controller 130, slice 2 controller 131, and slice 3 controller 132.

Referring to FIG. 1, slice 1, 120 consists of routers in sites A-D. A slice can have multiple strongly connected components of routers. Slice 1, 120 has two strongly connected components, the routers in sites A-C and D, respectively. Slice controller 2, 131 and slice controller 3, 132 may manage routers in sites E-F and G-H, respectively. The count and composition of slices may not be limited by the design but may be dictated by operational choice.

In an embodiment, only a slice's owning controller may program routers in the slice. All traffic from a slice router to any destination may be determined by the slice controller. This may include traffic that originates in datacenters directly connected to slice routers and the traffic originating in upstream slice routers. Each slice may be a separate deployment and may be patched independently.

Slices may inherit common configurations, but the decentralized traffic engineering system may apply slice-specific configuration independently. In an embodiment, slice controllers do not communicate with another slice controller. For example, data that define routing decisions determined by a slice controller does not include any data from other slices or other slice controllers. This further isolates faults and prevents byzantine controllers bringing the entire system down.

Slice controllers may operate with a global view of the network by acquiring global topology and demand inputs. Each slice controller may determine traffic engineering decisions based on expected conditions in local and remote slices. Slice controllers may anticipate what actions other slice controllers will take given the same inputs. While deviations between flow allocations computed by different slice controllers are possible, they typically will not be disruptive to the TE system operation.

The total number of decentralized traffic engineering system WAN slices are a consideration in the system's operating point and the tradeoff between network throughput and blast radius. A single slice enables the TE formulation to achieve maximum network throughput through centralization but exposes the network to the risk of global blast radius. In contrast, several decentralized traffic engineering system slices may reduce the blast radius of the slice controllers but may also reduce the achievable network throughput. Additionally, several WAN slices increase the operational overhead of configuring and maintaining slice controllers.

There is an optimal point for the number of slices that limits the risk of changes and keeps operational overhead manageable. In one embodiment, the number of decentralized traffic engineering system slices for a given network can be empirically derived to strike a balance between blast radius and network throughput.

Figure 2:
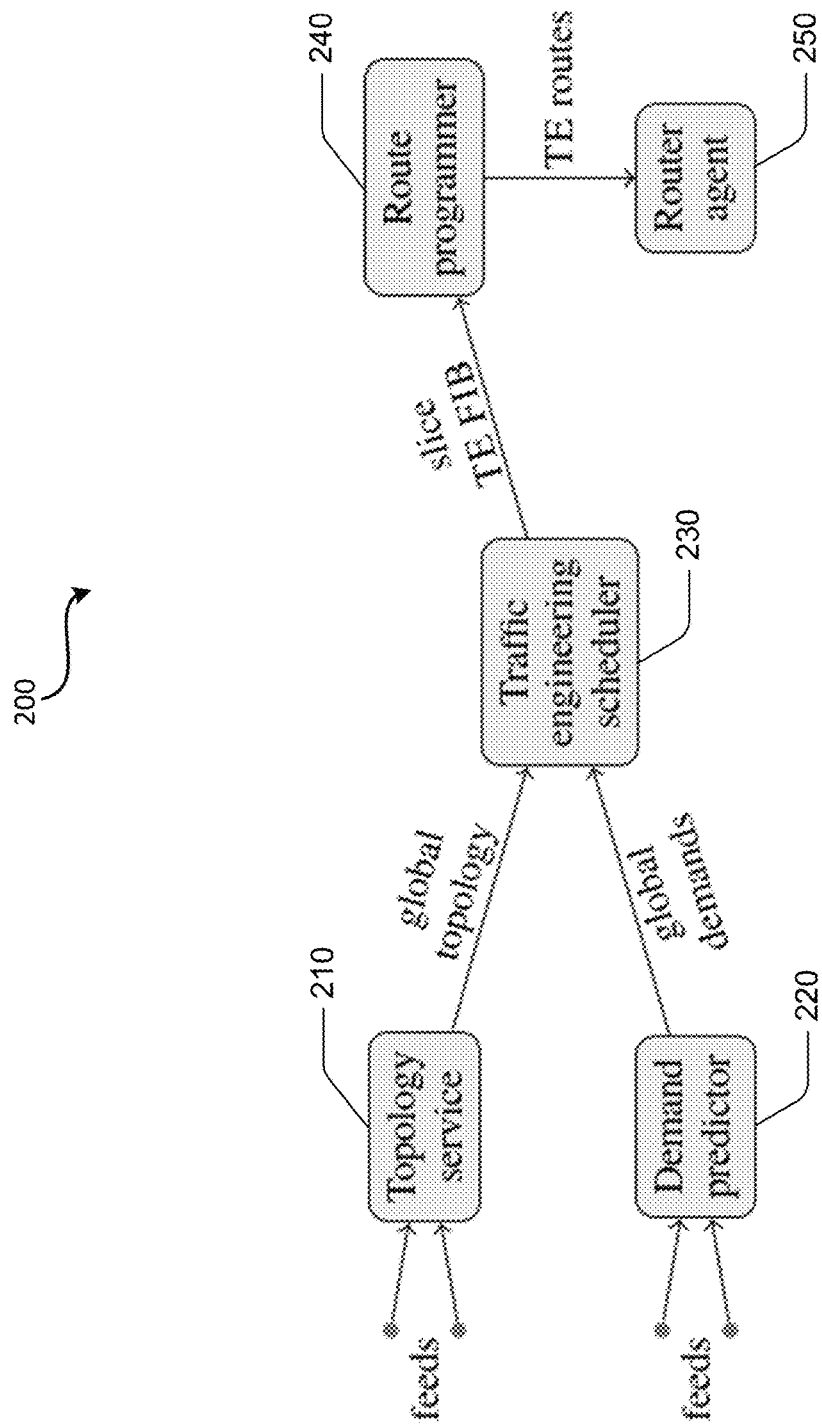
FIG. 2 is a diagram illustrating an example traffic engineering system in accordance with the present disclosure.

Referring to FIG. 2, a slice controller 200 may comprise a collection of four services: topology service 210, demand predictor 220, traffic engineering scheduler 230, and route programmer 240. In addition to the controller services that run on off-router compute nodes, a router agent 250 may run on all WAN routers.

The topology service 210 may synthesize the global network topology using graph metadata, link state, and router agent input feeds. Graph metadata may include routers, links, and sites. Border Gateway Protocol Link-State (BGP-LS) is one primary source of dynamic link state information that may include, e.g., link bandwidths, interface addresses, and segment identifiers. A feed for the router agent 250 may be is used to acquire the health of the router agent 250. A router may have a functioning agent to be used for traffic engineering.

The demand predictor 220 may predict upcoming global network demands using real-time traffic matrices measured by sFlow and host-level packet counters. Each network demand may be identified by the tuple: source router, destination site, and traffic class. Traffic class may be a differentiated service queue name e.g., voice, interactive, best-effort, or scavenger. Tier-0 traffic may use best-effort or higher traffic classes. Tier-1 and tier-2 may use the scavenger traffic class. The data feeds of the demand predictor 220 may be independently scaled out and not part of the controller.

Figure 3:
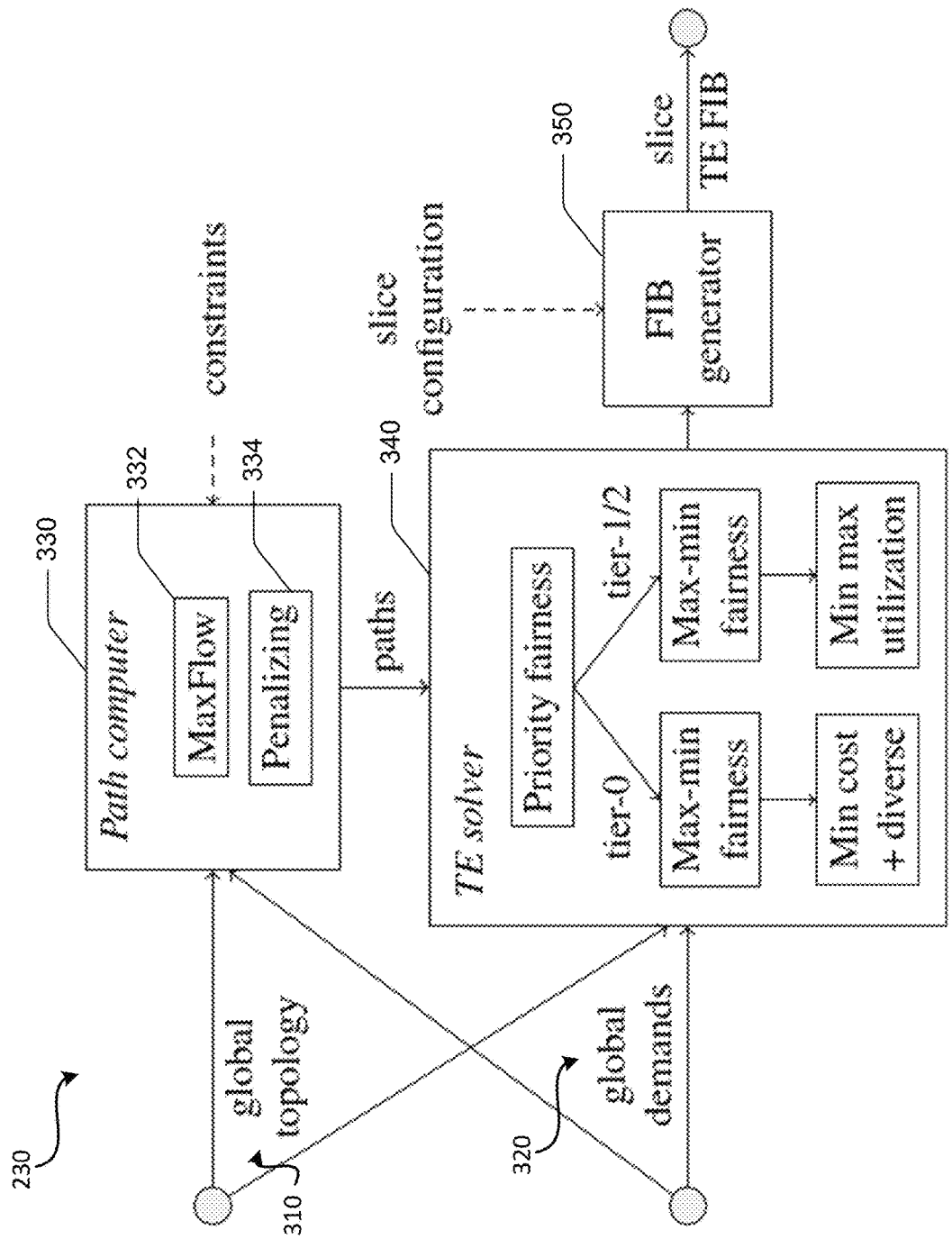
FIG. 3 is a diagram illustrating an example traffic engineering system in accordance with the present disclosure.

The traffic engineering scheduler 230 is further detailed in FIG. 3. The traffic engineering scheduler 230 may compute routes that optimize paths for flows by traffic tier. Each controller may perform global optimization based on its view of the entire network, but only programs routers belonging to its slice. The traffic engineering scheduler 230 may ingest global network topology 310 and global demands 320 from the topology service 210 and the demand predictor 230 respectively. The path computer 330 may calculate paths using the dynamic topology for the source-destination pairs in the global demands 320.

The MaxFlow path computer 332 may use maximum flow algorithms, and the penalizing path computer 334 may compute risk diverse shortest paths using the Dijkstra algorithm. Path constraints, as discussed further below, limit allowed paths in order to support the routing in the decentralized traffic engineering system.

The TE solver 340 may comprise a chain of linear programming optimization steps that place demands on multiple paths with unequal weights between demand source and destination pairs. The TE solver 340 may place tier-0 demands on paths with diversity protection that minimize latency subject to approximate max-min fairness. Lower priority demands in tier-1 and tier-2 classes may be placed on paths that minimize the maximum link utilization. For the purpose of illustration, the optimization problem formulations are not shown.

The FIB generator 350 may convert the output of the TE solver 340, which may be referred to as the solver result, into TE routes. The slice configuration specifies the subset of routers for which routes are generated. The FIB generator 350 may transform the solver result based on the slice configuration and produce routes only for the routers in the slice. The network may be re-optimized periodically, such as every 3 minutes, or upon topology change, whichever occurs first.

Figure 4:
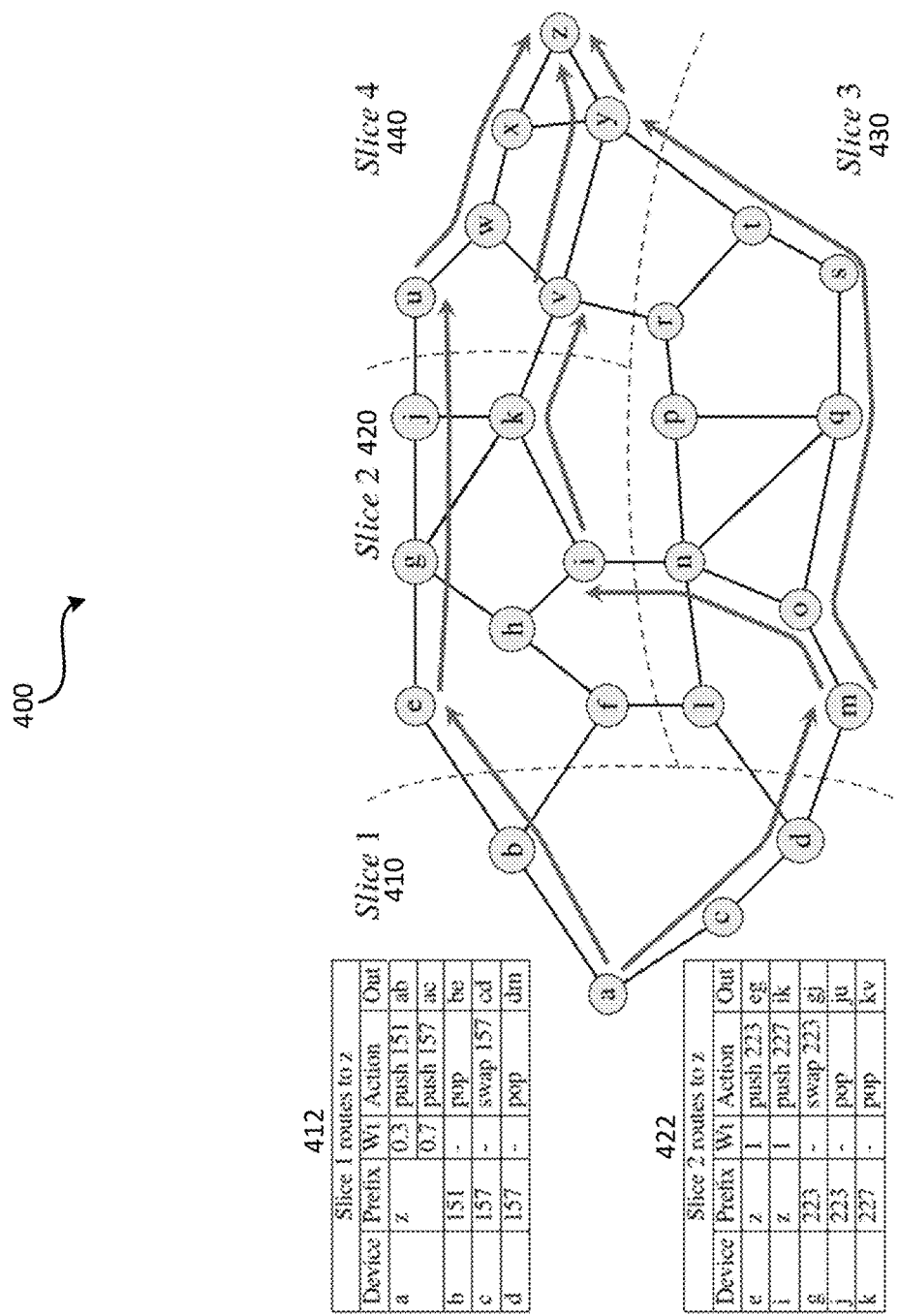
FIG. 4 is a diagram illustrating an example of slice routing in accordance with the present disclosure.

The route programmer 240 shown in FIG. 2 may program traffic engineering routes in the router agent 250 which in turn may install the programmed traffic engineering routes in the slice router. The route programmer 240 may periodically receive the full set of routes for all slice routers from the traffic engineering scheduler 230. The full set of routes may be referred to as the traffic engineering forwarding information base (TE FIB). The TE FIB may be organized into per-router flow and group tables, as illustrated in FIG. 4.

The route programmer 240 may update all slice router agents in parallel using an update procedure, which may be referred to as make-before-break. The principle is to make all new traffic engineered paths before placing traffic on them. Intermediate FIBs may build new paths, transfer traffic to the new paths, and tear down unused paths.

The router agent 250 may run on all WAN routers. The router agent 250 may be configured to install TE routes, monitor the end-to-end liveness of TE paths (tunnels), and modify ingress routes based on liveness information. Route installation on the router may involve translating the FIB into router platform-specific API calls. The router agent 250 may include a platform-dependent module to process this translation. The router agent 250 may verify tunnels within the slice using probes generated natively or with BFD from tunnel ingress points.

Flows may be unequally hashed to live paths based on the path weight, flow 5-tuple, and traffic class. If a path goes down, the router agent 250 may proportionally distribute the weight of the down path to remaining up paths. If no path is up, then the ingress route may be withdrawn, and packets may be forwarded using switch-native protocol routes. This may be referred to as local repair.

Each decentralized traffic engineering system slice controller 130 may consume global network topology and demands. The solver of each slice controller 130 may compute flow allocations for the entire network. Therefore, each slice controller 130 may produce the same solver result if its inputs and solver software versions are the same. In practice, inputs and software versions can differ. Although a slice controller 130 only programs the WAN routers in its slice, the slice controller 130 may optimize flow with a global view. Slice controllers 130 do not communicate with each other but gather inputs from the network. Performing global optimization at each slice controller 130 may be beneficial while deploying changes to the network. Some faults involve complex interactions that only occur in unique parts of the WAN. Global inputs increase the coverage of code paths while new software or configuration changes are being deployed in small blast radius slices.

In centralized TE systems, a single controller is typically responsible for programming all WAN routers with the TE routes. The decentralized traffic engineering system replaces the centralized controller with multiple slice controllers 130 that only program the routers within their slice. By preventing slice controllers from programming routers outside their slice, fault isolation can be enforced between slices. In addition, the routing mechanisms described herein ensure that the failure of one controller does not impede other controllers e.g., the failure of a downstream slice controller on an inter-slice route in the WAN does not lead to blackholing of traffic. Similarly, slice controllers with inconsistent views of the network may route packets to their destination without centralized control.

In an embodiment, all services may run on multiple machines in at least two geographically separate clusters. Topology service instances are fully active but may elect a leader to avoid oscillations if two instances report different topologies due to faults or transients. The traffic engineering scheduler and route programmer may elect leaders and switchover in case of failure. The route programmer may handle all the faults and inconsistencies that can occur during programming, e.g., router agents are unresponsive or have faults before, during, or after route programming. Reliable controller-agent communication may be achieved by using network control traffic class, and redundant data and management plane connections. The router agent can react to network faults even when it is disconnected from the router programmer.

In a conventional wide area network, packets are routed using a combination of switch-native protocols and the TE controller. WAN routers connected to the datacenter fabric advertise datacenter routes with themselves as the BGP next hop. BGP receivers recursively lookup the route for this BGP next hop and find multiple available routes: the shortest path route computed by the IGP, or the route programmed by the TE controller which leverages traffic engineered paths. TE routes have higher precedence than the IGP routes. The TE route encapsulates packets using Multiprotocol Label Switching (MPLS) path labels from a label range reserved for the TE controller.

The decentralized traffic engineering system routes inter-slice flows i.e., flows whose traffic engineered paths span multiple slices, using slice-local encapsulation to the slice boundary. Slice controllers add encapsulation headers while the packet is within the slice but ensure that the packets arrive at the next slice in their native encapsulation i.e., the encapsulation in which the packets entered the WAN. Each slice controller is only responsible for routing traffic to the ingress router of the next slice. Packets are encapsulated with an MPLS path label at the time of BGP route lookup on the WAN ingress router or the intermediate slice ingress routers. In both scenarios, transit routers forward the packet using the MPLS path label, and the label is removed by the penultimate router—either at a slice boundary or at the destination. Intra-slice traffic may be split across TE paths only once at the WAN ingress router. Inter-slice traffic can also be split at the ingress router of an intermediate slice.

FIG. 4 illustrates inter-slice routing using an example router-level network graph 400 divided into four slices 410, 420, 430, 440. The tables 412, 422, 432, 442 represent TE FIBs programmed by slice controllers using inter-slice routing. Each slice controller may program the path segment within its slice. For the path abeg juwxz, slice 1 programs abe, slice 2 programs eg ju, and slice 3 programs uwxz. Traffic arriving at slice ingress routers may be encapsulated and split over different paths. Transit routers may guide the packet along the path specified by the MPLS label. Packets may return to native encapsulation at the next slice and the WAN exit.

With reference to FIG. 4, in one example the controllers for the four slices 410, 420, 430, 440 may determine that the demand from a to z should be placed on paths abeg juwxz, acdmoqstyz, and acdmonikvyz with weights 0.3, 0.42, and 0.28 respectively. Slice 1 programs abe with weight 0.3, and acdm with weight 0.7. Slice 2 programs eg ju and ikv. Slice 3 programs moqsty with weight 0.6, and moni with weight 0.4, and slice 4 programs uwxz, vyz, and yz. Controllers only need to install routes in their slice routers.

If any downstream slice controller fails to program routes to the destination, packets may be forwarded using protocol routes along the shortest paths to the destination. Since segment routing is enabled with the IGP, the IGP route changes the packet encapsulation and routes the packet to the destination. For example, if the slice 2 controller withdraws all routes due to a failure, the inter-slice traffic uses shortest paths to the destination, z. This is the blast ripple of a down controller. Definition of slice boundaries to decrease the blast ripple is described further below. Downstream slice controllers may have slightly inconsistent views due to network events such as link flaps. Inter-slice traffic may be forwarded on shortest paths while the controllers converge.

Unlike the TE controller in a conventional network, a decentralized traffic engineering system slice controller is only responsible for routing packets within the slice and not until the packets' destination. Since each slice is its own routing domain, inconsistent views of the global network graph in different slice controllers can lead to routing loops.

The decentralized traffic engineering system avoids routing loops by enforcing enter-leave constraints on inter-slice next hops. These constraints define the set of inter-slice next hops for all source-destination pairs in the network. The constraints ensure loop-free paths and are calculated offline using a static network graph. The path computer calculates paths on the dynamic network graph, and only allow paths that satisfy the enter-leave constraints. However, enter-leave constraints should not be overly restrictive. For example, a potential approach to preventing routing loops can limit inter-slice next hops to be on the minimum spanning tree from the source router to the destination. However, this approach may restrict inter-slice paths to go through a few links and may cause bottlenecks.

Figure 5:
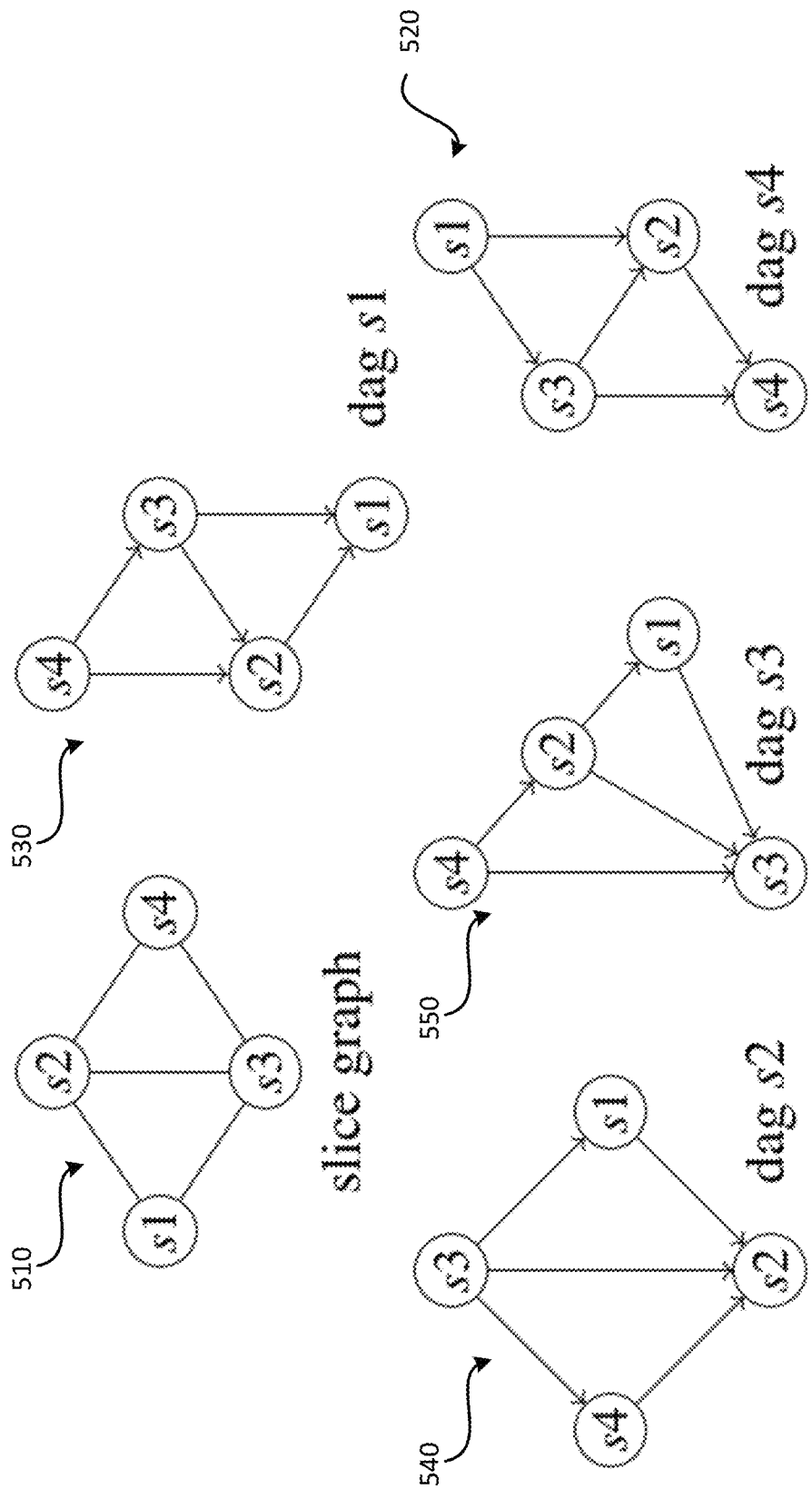
FIG. 5 is a diagram illustrating an example of slice routing in accordance with the present disclosure.

With reference to FIG. 5, enter-leave constraints may restrict paths to achieve loop-free routing. Slice graph 510 is a component level graph of FIG. 4. Slice directed acyclic graphs (DAG)s may be constructed from shortest path distances in the slice graph. Router-level paths must follow DAG edges when crossing slice boundaries. Path acdmonikvyz is allowed for TE because s1→s3→s2→s4 is a path in DAG s4. Path abfhinprvyz is not allowed for TE because s2→s3 is not present in DAG s4.

In an embodiment, an offline generator may compute enter-leave constraints from the static router-level network graph to prevent inter-slice routing loops. The offline generator may first construct a slice graph from the network graph, where each slice node represents a strongly connected component (SCC) after removing all inter-slice links. FIG. 5 is the slice graph of FIG. 4, formed by removing inter-slice links be, b f, dl, dm, f l, in, ju, kv, rv, and ty, and calculating SCCs. A slice can contribute one or more SCCs as nodes to the slice graph. A link between the slice graph nodes aggregates all links between SCCs in the network graph. Link weights in the slice graph are computed from link weights in the network graph.

The enter-leave constraint generator may then construct per-destination slice DAGs based on the shortest path distances in the slice graph. The enter-leave constraints come out directly from the slice DAGs. In FIG. 5, the slice DAG for s4 520 indicates that paths from any node in s1 to any node in s4 can only have inter-slice transitions: s1→s2→s4, s1→s3→s4, and s1→s3→s2→s4. No controller, no matter its topology, can use any other inter-slice transition. The slice DAG for s1 530, s2, 540, and s3 550 show additional examples.

The path computer may blacklist edges excluded by enter-leave constraints in the dynamic network graph before computing TE paths. Since the slice DAG is loop-free, paths computed by any slice controller are also loop-free. This ensures that even if slice controllers have inconsistent views of the dynamic network graph, they will arrive at loop free routes. Enter-leave constraints place restrictions on TE paths and reduce the number of paths available to place demands.

Due to the negative impact of routing loops in production, and because they are global configurations, in some embodiments enter-leave constraints may be verified offline before deployment. Enter-leave constraints may be updated when there are newly provisioned routers or inter-slice links in the network. They do not need to be updated for newly provisioned intra-slice links.

The following defines inter-slice routing. Let R be the set of defined route keys, where route key is a tuple of (router, destination prefix), end be the terminating route key, null be the undefined route key, and ttl be the packet time to live. Let f: R→R, where f (null)=null, f (end)=end. Routing is a repeated application of f( ), till $f^n(x)$=end where n ranges over $1 \le n \le ttl$. The collection of TE, BGP, and the IGP routes, and their union are examples of routing functions. The routing function is complete, loops, or blackholes, if:

$\forall x, \exists n: f^n(x)$=end (complete)
$\exists x, n: f^n(x)$=x (routing loop)
$\exists x, n: f^n(x)$=null (blackhole)

where x ranges over R \{end, null} and n ranges over [1 . . . tll]. Enter-leave constraints may be verified using the above to detect routing loops.

Figure 6:
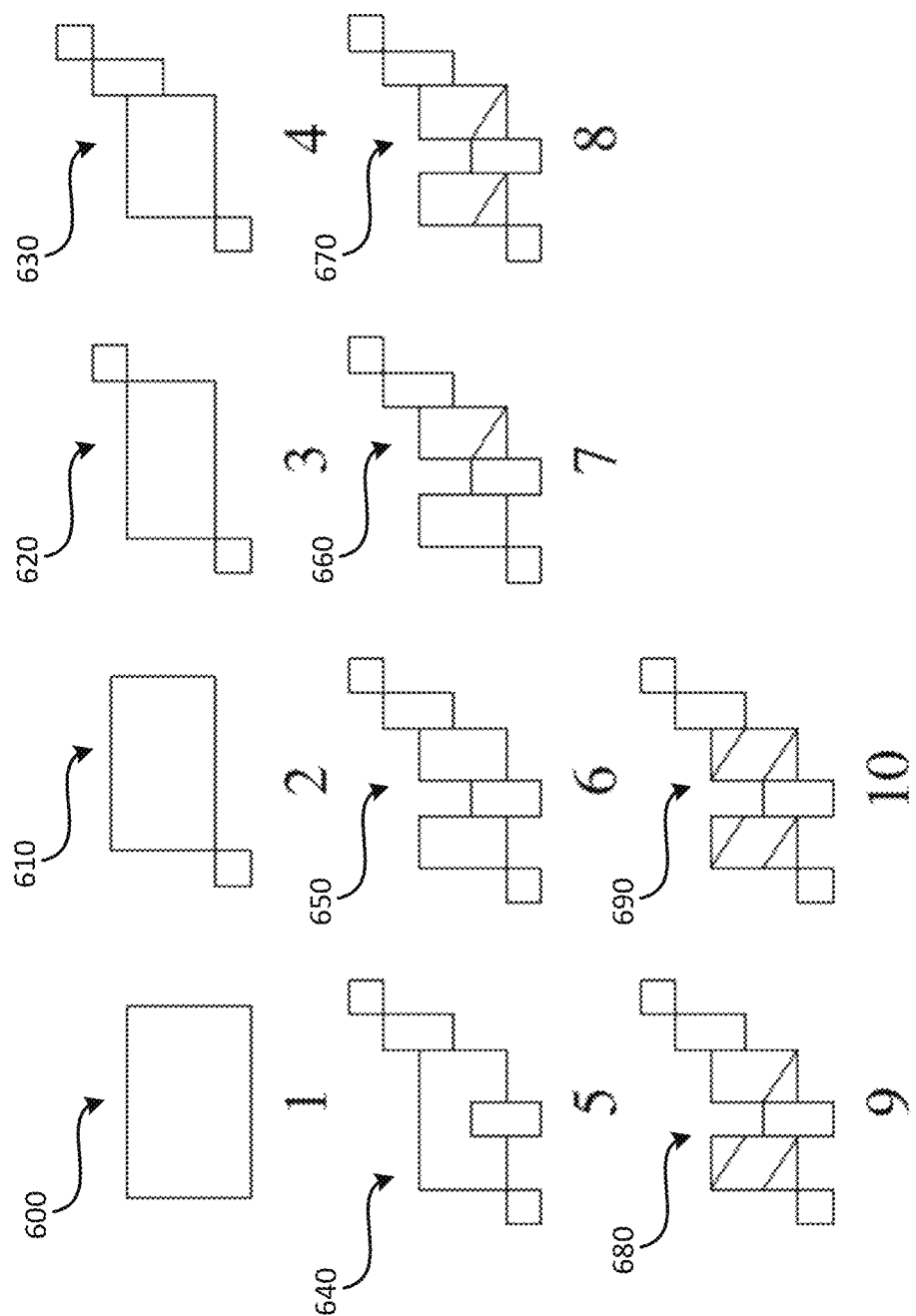
FIG. 6 is a diagram illustrating an example of failure scenarios in accordance with the present disclosure.

Slices may be incrementally carved out from the global cloud network as shown in the example of FIG. 6. FIG. 6 illustrates ten slice configurations of an example global cloud network, with ten different slicing configurations with increasing number of slices from 1 to 10. Slice configuration 1 600 represents centralized traffic engineering as in a conventional network. Slice configurations 2-6 may be formed by drawing slice boundaries around large geographical regions. Slice configuration 2 610 represents the network divided into two slices with one region and the rest of the world, slice configuration 3 620 represents two regions and the rest of the world, slice configuration 4 630 represents three regions and the rest of the world, slice configuration 5 640 represents four regions and the rest of the world, and slice configuration 6 650 represents six total regions. Slices 7-10 660, 670, 680, 690 may be formed by additionally dividing the two largest geographies into smaller slices.

One technical effect of the disclosed decentralized traffic engineering system is the reduction in blast radius when a slice controller fails. In an example failure where the slice controller removes all programmed TE routes, this causes the traffic to fall back on protocol routes and the ensuing traffic loss is the impact of the slice failure. The disclosed techniques enable isolated slices with a small blast radius and no inter-slice traffic. Outages caused by failures in a slice is prevented from causing a global impact, even with inter-slice traffic.

A byzantine controller is an unreliable controller that is disseminating false information or otherwise sabotaging the operation of other slices in the network. Resistance to byzantine slice controllers is another technical effect of the decentralized traffic engineering system. The decentralized traffic engineering system does not allow any inter-controller interaction. Each controller uses its own services to get demand and topology inputs. Each controller calculates TE routes by sensing the state of the network and does not rely on communication with other controllers. Route programmers of a WAN slice do not communicate with router agents in other slices, and thus are unaffected by unreliable agents in other slices. Access control lists on slice routers prevent another slice controller from attempting to program them.

Despite these protections, a byzantine controller may route traffic in a way that causes congestion in downstream slices. A slice controller estimates the demands at the slice boundary based on the assumption that all slices are well behaved i.e., they use the same algorithm and configuration as itself. A byzantine slice can violate this assumption. The impact of a byzantine controller's actions is limited to the remote traffic from the byzantine slice. WAN traffic patterns inform the creation of slices that minimize inter-slice traffic.

In an embodiment, the disclosure describes a traffic engineering system for a computing network, wherein the network is divided into network slices, wherein each network slice is controlled by a slice controller; wherein the slice controller independently routes traffic within each slice to maximize overall network throughput based on expected conditions in local and remote slices and without relying on hierarchical or central coordination; and wherein flows whose span multiple slices are routed using constraints to prevent loops.

In the traffic engineering system, inter-slice communications may be implemented in the computing network using Multiprotocol Label Switching (MPLS) which may improve network efficiencies and reduce complexity as compared to using internet protocol (IP). For example, MPLS switches may be utilized in the network.

The traffic engineering system may also include efficient encoding of slice constraints to improve performance of the slice controllers, thereby reducing the size of the constraint data by using slice definitions. The constraints may be represented by a large amount of data and the size can be reduced. The constraint data includes node to slice definitions, links or edges, and the disallowed links for a given source and destination. In an embodiment, the disallowed links may be represented using the slice source and destination.

Figure 7:
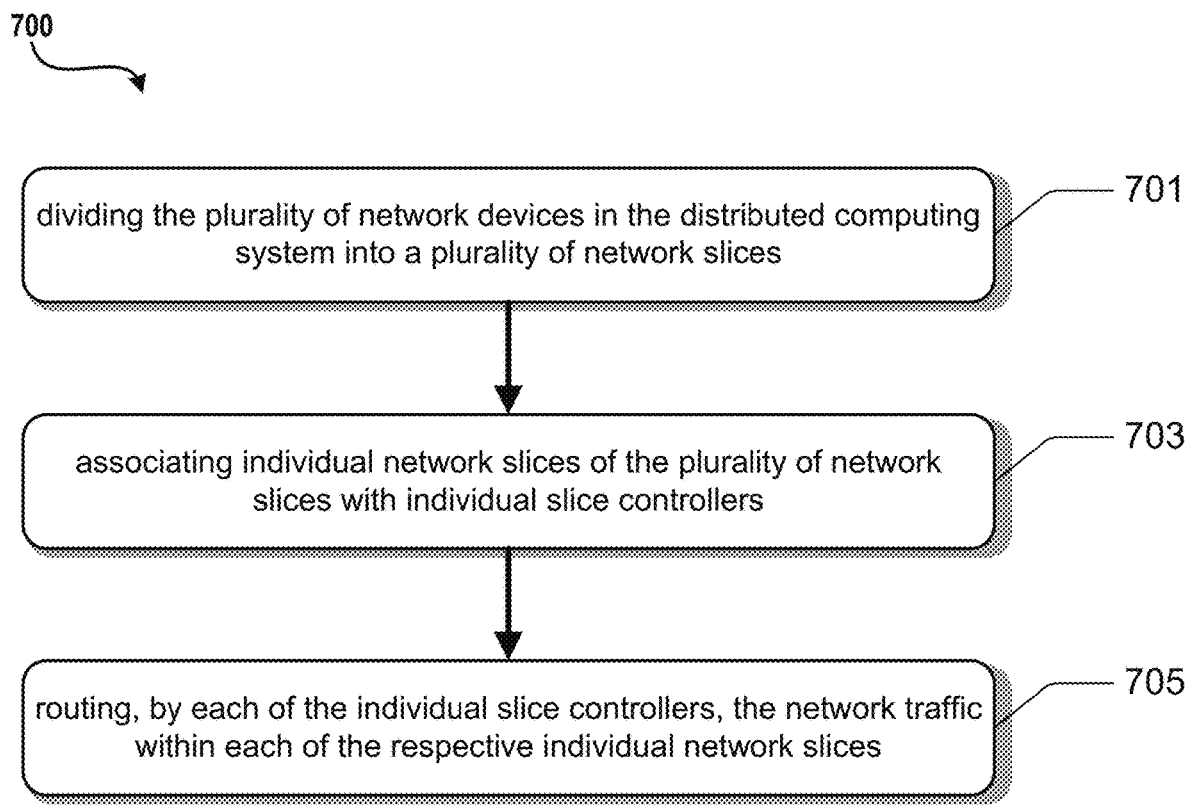
FIG. 7 is a flowchart depicting an example procedure for traffic engineering in accordance with the present disclosure.

Turning now to FIG. 7, illustrated is an example operational procedure for managing network traffic in a distributed computing system in accordance with the present disclosure. In an embodiment, the computing system comprises a plurality of network devices that are configured to send or receive network traffic in the distributed computing system. Such an operational procedure may provide for managing network traffic and can be provided by one or more components illustrated in FIGS. 1 through 6. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 7, operation 701 illustrates dividing the plurality of network devices in the distributed computing system into a plurality of network slices. In an embodiment, each of the plurality of network slices include a subset of the plurality of network devices such that there is no overlap of network devices between the network slices.

Operation 701 may be followed by operation 703. Operation 703 illustrates associating individual network slices of the plurality of network slices with individual slice controllers. In an embodiment, an individual slice controller is configured to manage network routing of an individual network slice.

Operation 703 may be followed by operation 705. Operation 705 illustrates routing, by each of the individual slice controllers, the network traffic within each of the respective individual network slices. In an embodiment, the network traffic is independently routed based on expected network conditions for each of the respective individual network slices. In an embodiment, data defining routing decisions is contained within each network slice to limit fault effects between the network slices.

Figure 8:
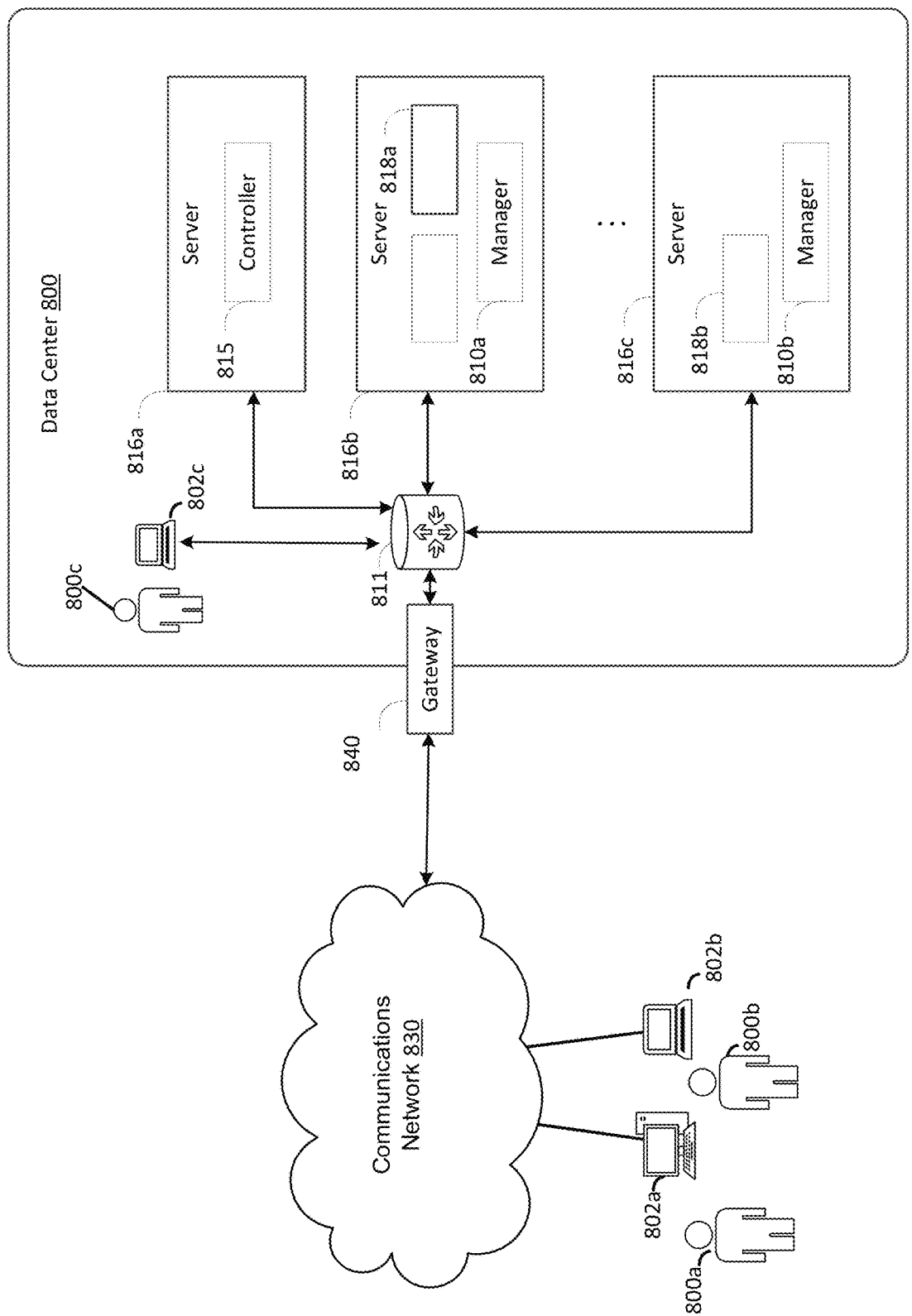
FIG. 8 is an example computing system in accordance with the present disclosure.

FIG. 8 illustrates one example of a general computing environment in which the embodiments described herein may be implemented. FIG. 8 illustrates a data center 800 that is an example of a distributed computing system in some embodiments. The data center 800 is configured to provide computing resources to users 800*a*, 800*b*, or 800*c* (which may be referred herein singularly as "a user 800" or in the plural as "the users 800") via user computers 802*a*,802*b*, and 802*c* (which may be referred herein singularly as "a computer 802" or in the plural as "the computers 802") via a communications network 830. The computing resources provided by the data center 800 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 800 may include servers 816*a*, 816*b*, and 816*c* (which may be referred to herein singularly as "a server 816" or in the plural as "the servers 816") that provide computing resources available as virtual machines or containers 818*a* and 818*b* (which may be referred to herein singularly as "a virtual machine 818" or in the plural as "the virtual machines 818" or as "a container 818" or in the plural as "the containers 818"). The virtual machines or containers 818 may be configured to execute applications such as Web servers, application servers, media servers, database servers, and the like. Other resources that may be provided include data storage resources (not shown on FIG. 8) and may include file storage devices, block storage devices, and the like. Servers 816 may also execute functions that manage and control allocation of resources in the data center, such as a controller 815. Controller 815 may be a fabric controller or another type of program configured to manage the allocation of virtual machines or containers on servers 816.

Referring to FIG. 8, communications network 830 may, for example, be a publicly accessible network of linked networks and may be operated by various entities, such as the Internet. In other embodiments, communications network 830 may be a private network, such as a corporate network that is wholly or partially inaccessible to the public.

Communications network 830 may provide access to computers 802. Computers 802 may be computers utilized by users 800. Computer 802a, 802b or 802c may be a server, a desktop or laptop personal computer, a tablet computer, a smartphone, a set-top box, or any other computing device capable of accessing data center 800. User computer 802a or 802b may connect directly to the Internet (e.g., via a cable modem). User computer 802c may be internal to the data center 800 and may connect directly to the resources in the data center 800 via internal networks. Although only three user computers 802a, 802b, and 802c are depicted, it should be appreciated that there may be multiple user computers.

Computers 802 may also be utilized to configure aspects of the computing resources provided by data center 800. For example, data center 800 may provide a Web interface through which aspects of its operation may be configured through the use of a Web browser application program executing on user computer 802. Alternatively, a stand-alone application program executing on user computer 802 may be used to access an application programming interface (API) exposed by data center 800 for performing the configuration operations.

Servers 816 may be configured to provide the computing resources described above. One or more of the servers 816 may be configured to execute a manager 820a or 820b (which may be referred herein singularly as "a manager 820" or in the plural as "the managers 820") configured to execute the virtual machines. The managers 820 may be a virtual machine monitor (VMM), fabric controller, or another type of program configured to enable the execution of virtual machines or containers 818 on servers 816, for example.

It should be appreciated that although the embodiments disclosed above are discussed in the context of virtual machines and containers, other types of implementations can be utilized with the concepts and technologies disclosed herein.

In the example data center 800 shown in FIG. 8, a network device 811 may be utilized to interconnect the servers 816a and 816b. Network device 811 may comprise one or more switches, routers, or other network devices. Network device 811 may also be connected to gateway 840, which is connected to communications network 830. Network device 811 may facilitate communications within networks in data center 800, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 800 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 800 illustrated in FIG. 8, which are configured to host physical and/or virtualized computer servers, storage devices, networking equipment and the like, that may be used to implement and distribute the infrastructure and services offered by the service provider.

Figure 9:
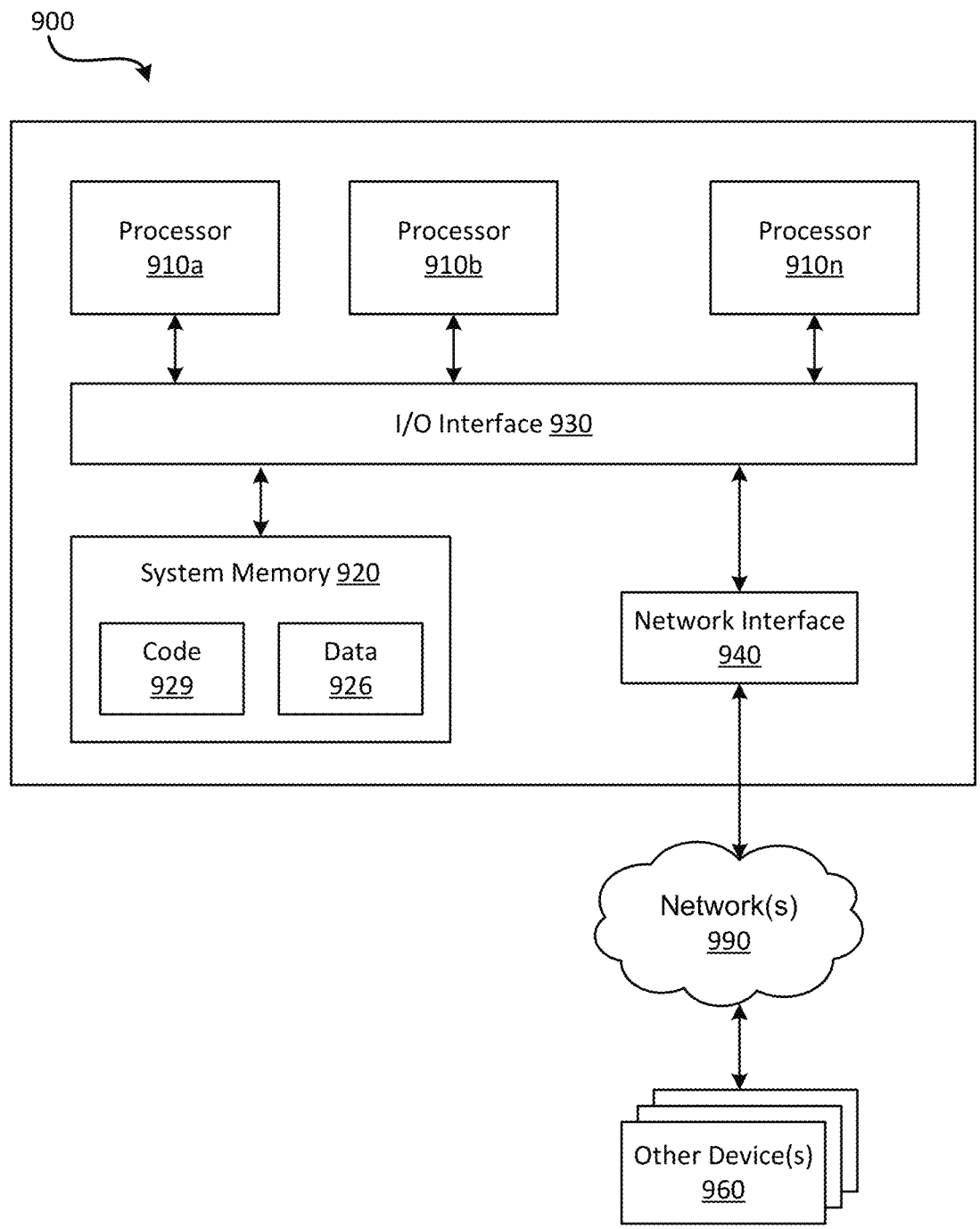
FIG. 9 is an example computing system in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 929 and data 926.

In one embodiment, I/O interface 930 may be configured to coordinate I/O traffic between the processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 990, such as other computer systems or devices as illustrated in FIGS. 1 through 7, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing network traffic in a distributed computing system comprising a plurality of network devices that are configured to send or receive network traffic between the plurality of network devices, the method comprising:
- dividing the plurality of network devices in the distributed computing system into a plurality of network slices, wherein each of the plurality of network slices include a subset of the plurality of network devices such that there is no overlap of network devices between the network slices;
- associating individual network slices of the plurality of network slices with individual slice controllers, wherein an individual slice controller is configured to manage network routing of an individual network slice; and
- routing, by each of the individual slice controllers, the network traffic within each of the respective individual network slices, wherein the network traffic is independently routed based on expected network conditions for each of the respective individual network slices, and wherein data defining routing decisions is contained within each network slice to limit fault effects between the network slices.

Clause 2: The method of clause 1, further comprising controlling routing of the network traffic between network slices to prevent network routing loops.

Clause 3: The method of any of clauses 1-2, wherein the controlling the routing of the network traffic comprises configuring each of the slice controllers with constraint data.

Clause 4: The method of any of clauses 1-3, wherein the constraint data comprises disallowed links represented by slice source and destination identifiers.

Clause 5: The method of any of clauses 1-4, wherein inter-slice communications are implemented using Multi-protocol Label Switching (MPLS).

Clause 6: The method of any of clauses 1-5, wherein network traffic is routed by each slice controller such that a failure of one of the slice controllers in one of the network slices does not impede routing of network traffic in other network slices.

Clause 7: The method of clauses 1-6, wherein inter-slice flows use slice-local encapsulation to a slice boundary.

Clause 8: The method of any of clauses 1-7, wherein packets are forwarded using protocol routes along shortest paths to packet destinations when a downstream slice controller fails to program routes to the packet destinations.

Clause 9: A system for managing network traffic in a distributed system comprising a plurality of network devices, the system comprising:
one or more computing devices comprising a processor and a memory in communication with the processor, the memory having computer-readable instructions stored thereupon that, when executed by the processor, cause the system to perform operations comprising:
associating each network slice of a plurality of network slices of a distributed computing system with a slice controller, wherein the distributed computing system comprises a plurality of network devices that are divided into the plurality of network slices, each of the plurality of network slices including a subset of the plurality of network devices such that there is no overlap of the network devices between the network slices, and wherein each slice controller is configured to manage network routing of a network slice associated with the slice controller; and
routing, by each of the slice controllers, network traffic within each of the respective network slices, wherein the network traffic is independently routed based on expected network conditions for each of the respective network slices, and wherein data defining routing decisions is contained within each network slice to limit fault effects between the network slices.

Clause 10: The system of clause 9, further comprising computer-readable instructions stored thereupon that, when executed by the one or more processors, cause the system to perform operations comprising:
controlling routing of the network traffic between network slices to prevent network routing loops.

Clause 11: The system of any of clauses 9 and 10, wherein the controlling the routing of the network traffic comprises configuring each of the slice controllers with constraint data.

Clause 12: The system of any clauses 9-11, wherein the constraint data comprises disallowed links represented by slice source and destination identifiers.

Clause 13: The system of any clauses 9-12, wherein network traffic is routed by each slice controller such that a failure of one of the slice controllers in one of the network slices does not impede routing of network traffic in other network slices.

Clause 14: A computer-readable storage medium having computer-executable instructions stored thereupon which, when executed by one or more processors of a computing device, cause the computing device to:
associate each network slice of a plurality of network slices of a distributed computing system with a slice controller, wherein the distributed computing system comprises a plurality of the network devices that are divided into the plurality of network slices, each of the plurality of network slices including a subset of the plurality of network devices such that there is no overlap of the network devices between the network slices, and wherein each slice controller is configured to manage network routing of a network slice associated with the slice controller; and
route, by each of the slice controllers, network traffic within each of the respective network slices, wherein the network traffic is independently routed based on expected network conditions for each of the respective network slices, and wherein data defining routing decisions is contained within each network slice to limit fault effects between the network slices.

Clause 15: The computer-readable storage medium of clause 14, further comprising computer-executable instructions stored which, when executed by one or more processors of a computing device, cause the computing device to controlling routing of the network traffic between network slices to prevent network routing loops.

Clause 16: The computer-readable storage medium of any of clauses 14 and 15, wherein the controlling the routing of the network traffic comprises configuring each of the slice controllers with constraint data.

Clause 17: The computer-readable storage medium of any of the clauses 14-16, wherein the constraint data comprises disallowed links represented by slice source and destination identifiers.

Clause 18: The computer-readable storage medium of any of the clauses 14-17, wherein network traffic is routed by each slice controller such that a failure of one of the slice controllers in one of the network slices does not impede routing of network traffic in other network slices.

Clause 19: The computer-readable storage medium of any of the clauses 14-18, wherein inter-slice flows use slice-local encapsulation to a slice boundary.

Clause 20: The computer-readable storage medium of any of the clauses 14-19, wherein packets are forwarded using protocol routes along shortest paths to packet destinations when a downstream slice controller fails to program routes to the packet destinations.

What is claimed is:

1. A method for managing network traffic in a distributed computing system configured as a wide area network comprising a plurality of network devices assigned to non-overlapping network slices, wherein each non-overlapping network slice is a smaller fault domain of the wide area network, the method comprising:
associating individual network slices with individual slice controllers, wherein an individual slice controller is configured to manage network routing of an individual network slice and wherein fault isolation is enforced between the non-overlapping network slices; and
routing, by each of the individual slice controllers, the network traffic within each of the respective individual network slices, wherein the network traffic is independently routed based on expected network conditions for each of the respective individual network slices, and wherein data defining routing decisions is contained within each network slice to limit fault effects between the network slices;

wherein routing of the network traffic between network slices is controlled by configuring each of the slice controllers with constraint data comprising disallowed links.

2. The method of claim 1, further comprising controlling routing of the network traffic between network slices to prevent network routing loops.

3. The method of claim 1, wherein the disallowed links are represented by slice source and destination identifiers.

4. The method of claim 1, wherein inter-slice communications are implemented using Multiprotocol Label Switching (MPLS).

5. The method of claim 1, wherein network traffic is routed by each slice controller such that a failure of one of the slice controllers in one of the network slices does not impede routing of network traffic in other network slices.

6. The method of claim 1, wherein inter-slice flows use slice-local encapsulation to a slice boundary.

7. The method of claim 1, wherein packets are forwarded using protocol routes along shortest paths to packet destinations when a downstream slice controller fails to program routes to the packet destinations.

8. The method of claim 1, wherein the plurality of network devices in the distributed computing system are divided into a plurality of network slices, wherein each of the plurality of network slices include a subset of the plurality of network devices such that there is no overlap of network devices between the network slices.

9. A system for managing network traffic in a distributed system configured as a wide area network comprising a plurality of network devices assigned to non-overlapping network slices, wherein each non-overlapping network slice is a smaller fault domain of the wide area network, the system comprising:
one or more computing devices comprising a processor and a memory in communication with the processor, the memory having computer-readable instructions stored thereupon that, when executed by the processor, cause the system to perform operations comprising:
associating the non-overlapping network slices with a respective slice controller, wherein each slice controller is configured to manage network routing of associated non-overlapping network slices and wherein fault isolation is enforced between the non-overlapping network slices; and
routing, by each respective slice controller, network traffic within each of the non-overlapping network slices, wherein the network traffic is independently routed based on expected network conditions for each of the non-overlapping network slices, and wherein data defining routing decisions is contained within each network slice to limit fault effects between the non-overlapping network slices;
wherein routing of the network traffic between network slices is controlled by configuring each of the slice controllers with constraint data comprising disallowed links.

10. The system of claim 9, wherein:
the disallowed links are represented by slice source and destination identifiers.

11. The system of claim 9, wherein network traffic is routed by the respective slice controllers such that a failure of one of the slice controllers in one of the network slices does not impede routing of network traffic in other network slices.

12. A computer-readable storage medium having computer-executable instructions stored thereupon which, when executed by one or more processors of a computing device, cause the computing device to:
associate each network slice of a plurality of non-overlapping network slices of a distributed computing system with a slice controller, wherein each slice controller is configured to manage network routing of a network slice associated with the slice controller, wherein the distributed system is configured as a wide area network comprising a plurality of network devices assigned to non-overlapping network slices, wherein each non-overlapping network slice is a smaller fault domain of the wide area network, and wherein fault isolation is enforced between the non-overlapping network slices; and
route, by each of the slice controllers, network traffic within each of the respective network slices, wherein the network traffic is independently routed based on expected network conditions for each of the respective network slices, and wherein data defining routing decisions is contained within each network slice to limit fault effects between the network slices;
wherein routing of the network traffic between network slices is controlled by configuring each of the slice controllers with constraint data comprising disallowed links.

13. The computer-readable storage medium of claim 12, further comprising computer-executable instructions stored which, when executed by one or more processors of a computing device, cause the computing device to controlling routing of the network traffic between network slices to prevent network routing loops.

14. The computer-readable storage medium of claim 12, wherein the disallowed links are represented by slice source and destination identifiers.

15. The computer-readable storage medium of claim 12, wherein network traffic is routed by each slice controller such that a failure of one of the slice controllers in one of the network slices does not impede routing of network traffic in other network slices.

16. The computer-readable storage medium of claim 15, wherein inter-slice flows use slice-local encapsulation to a slice boundary.

17. The computer-readable storage medium of claim 12, wherein packets are forwarded using protocol routes along shortest paths to packet destinations when a downstream slice controller fails to program routes to the packet destinations.

* * * * *